(12) United States Patent
Watanabe et al.

(10) Patent No.: US 11,634,794 B2
(45) Date of Patent: Apr. 25, 2023

(54) ALUMINUM ALLOY, MANUFACTURING METHOD OF LAMINATED MOLDING AND LAMINATED MOLDING

(71) Applicant: HONDA MOTOR CO., LTD., Tokyo (JP)

(72) Inventors: Hiroyuki Watanabe, Saitama (JP); Atsushi Itani, Tokyo (JP); Kazuo Kikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/671,612

(22) Filed: Feb. 15, 2022

(65) Prior Publication Data

US 2022/0307113 A1    Sep. 29, 2022

(30) Foreign Application Priority Data

Mar. 26, 2021    (JP) .............................. JP2021-052963

(51) Int. Cl.
| | | |
|---|---|---|
| *C22C 21/02* | (2006.01) | |
| *B22F 7/02* | (2006.01) | |
| *B22F 3/00* | (2021.01) | |

(52) U.S. Cl.
CPC .............. *C22C 21/02* (2013.01); *B22F 3/004* (2013.01); *B22F 7/02* (2013.01); *B22F 2301/052* (2013.01); *B22F 2999/00* (2013.01)

(58) Field of Classification Search
CPC .......... C22C 21/02; C22C 1/043; C22F 1/043
See application file for complete search history.

(56) References Cited

U.S. PATENT DOCUMENTS

| | | | | |
|---|---|---|---|---|
| 6,334,916 | B1 * | 1/2002 | Matsumoto ............. | C22C 21/02 148/440 |
| 2015/0315688 | A1 * | 11/2015 | Doty ........................ | C22C 21/02 148/439 |
| 2020/0063241 | A1 | 2/2020 | Adachi et al. | |

FOREIGN PATENT DOCUMENTS

| | | | | |
|---|---|---|---|---|
| FR | 2876117 A1 * | 4/2006 | ............. | C22C 21/02 |
| JP | 6393008 B1 | 9/2018 | | |

\* cited by examiner

*Primary Examiner* — Jessee R Roe
(74) *Attorney, Agent, or Firm* — CKC & Partners Co., LLC

(57) ABSTRACT

The present disclosure provides an aluminum alloy to be used in laminate molding containing Si, Fe, Mn and inevitable impurities, in which α-phase Al—Si—Fe intermetallic compound is present in the aluminum alloy. In addition, a manufacturing method of a laminated molding is provided which laminate molds using powder of this aluminum alloy. Further, a laminate molding of this aluminum alloy is provided.

5 Claims, 3 Drawing Sheets

COMPARATIVE EXAMPLE 1

EXAMPLE 1-1

EXAMPLE 1-2

ALUMINUM ALLOY, MANUFACTURING METHOD OF LAMINATED MOLDING AND LAMINATED MOLDING

This application is based on and claims the benefit of priority from Japanese Patent Application No. 2021-052963, filed on 26 Mar. 2021, the content of which is incorporated herein by reference.

BACKGROUND OF THE INVENTION

Field of the Invention

The present invention relates to an aluminum alloy used in laminate molding, a manufacturing method of laminated molding and a laminated molding.

Related Art

A method of manufacturing a laminated molding of aluminum alloy using a metal 3D printer has been known. At this time, a process of solidification is repeated after spreading aluminum alloy powder and dissolving aluminum alloy powder by irradiating a laser beam or electron beam onto a specific site.

In order to improve the mechanical strength of a laminated molding of aluminum alloy, for example, it has been disclosed to add at least one among Mn and Cr to an aluminum alloy containing Si, and Fe, which is inevitable impurities (for example, refer to Patent Document 1).
Patent Document 1: Japanese Patent No. 6393008

SUMMARY OF THE INVENTION

However, it has been desired to improve the mechanical strength of a laminated molding using an aluminum alloy abundantly containing cheap Fe.

Herein, for aluminum alloy containing Si and Fe, there is a problem in that the malleability of aluminum alloy declines due to the β-phase Al—Si—Fe metal intermetallic compound ($Al_5FeSi$) growing during manufacture. The β-phase Al—Si—Fe metal intermetallic compound has a crystalline structure which is a monoclinic crystal system, is planar (pointed cross section), and thus is brittle.

The present invention has an object of providing an aluminum alloy capable of improving malleability.

One aspect of the present invention is an aluminum alloy to be used in laminate molding, the aluminum alloy containing Si, Fe, Mn and inevitable impurities, in which α-phase Al—Si—Fe intermetallic compound is present in the aluminum alloy.

In the above-mentioned aluminum alloy, content of Si may be at least 3% by mass and no more than 20% by mass, content of Fe may be at least 0.5% by mass and no more than 7% by mass, and content of Mn may be at least 0.1% by mass and no more than 7% by mass.

The above-mentioned aluminum alloy may further contain Be or Zr.

In the above-mentioned aluminum alloy, content of Be may be at least 0.05% by mass and no more than 1% by mass, and content of Zr may be at least 0.2% by mass and no more than 5% by mass.

The above-mentioned aluminum alloy may further contain Cu, Zn, Mg, Ti, and Ni.

Another aspect of the present invention is a manufacturing method of a laminated molding, the method including a step of laminate molding using powder of the above-mentioned aluminum alloy.

Another aspect of the present invention is a laminated molding of the above-mentioned aluminum alloy.

According to the present invention, it is possible to provide an aluminum alloy capable of improving malleability.

DETAILED DESCRIPTION OF THE INVENTION

Figure 1:
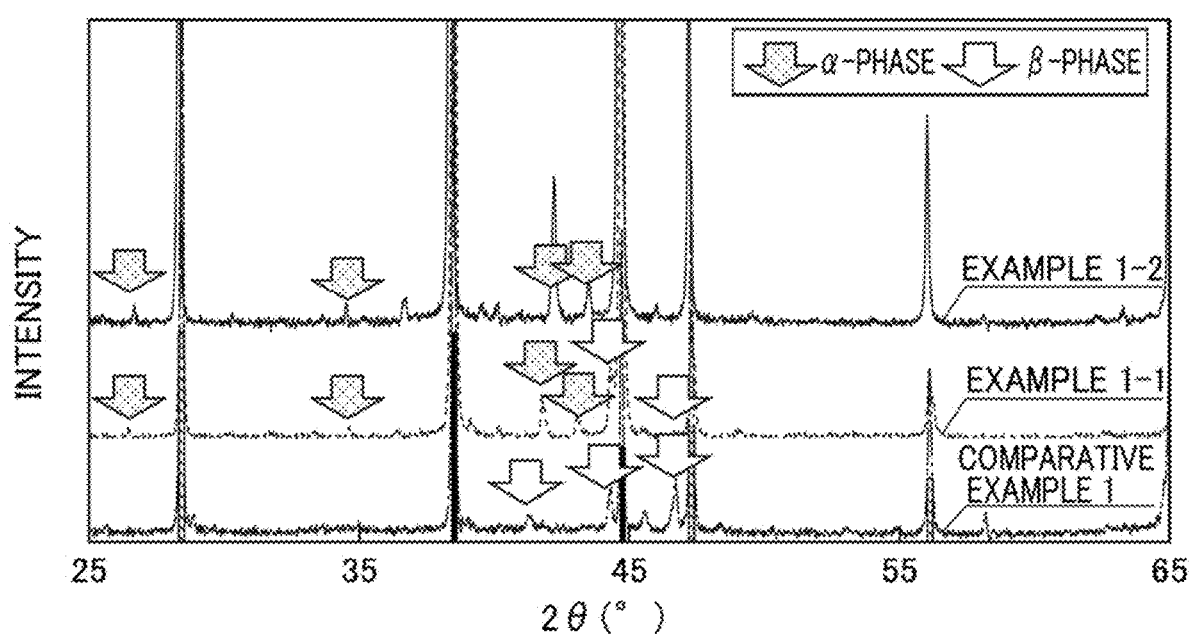
FIG. 1 is a graph showing the X-ray diffraction spectra of aluminum alloys of Examples 1-1 and 1-2, and Comparative Example 1.

Hereinafter, an embodiment of the present invention will be explained while referencing the drawings.
(Aluminum Alloy)

An aluminum alloy of the present embodiment contains Si, Fe, Mn and inevitable impurities, and an α-phase Al—Si—Fe intermetallic compound ($Al_{15}Fe_3Si_2$) is present. In the aluminum alloy of the present embodiment, since the α-phase Al—Si—Fe intermetallic compound is present, growth of the β-phase Al—Si—Fe intermetallic compound is suppressed. As a result, malleability of the aluminum alloy of the present embodiment improves. Herein, the α-phase Al—Si—Fe intermetallic compound has a crystalline structure which is a cubic crystal system, and is granular. In addition, in the case of the aluminum alloy of the present embodiment containing Zn, the corrosion resistance of the aluminum alloy of the present embodiment improves. Furthermore, an aluminum secondary alloy base metal abundantly containing impurities such as Fe and Zn can be used as the raw material of the aluminum alloy of the present embodiment. The aluminum secondary alloy base metal is a material having low load on the environment due to the emission rate of $CO_2$ during manufacture being small.

It should be noted that the aluminum alloy of the present embodiment is used in laminate molding.

The content of Si in the aluminum alloy of the present embodiment is at least 3% by mass and no more than 20% by mass, and preferably at least 5% by mass and no more than 15% by mass. If the content of Si in the aluminum alloy of the present embodiment is at least 3% by mass, pull cracking of the aluminum alloy of the present embodiment will hardly occur, and if no more than 20% by mass, solidification cracking of the aluminum alloy of the present embodiment will hardly occur.

The content of Fe in the aluminum alloy of the present embodiment is at least 0.5% by mass and no more than 7% by mass, and preferably at least 1% by mass and no more than 3% by mass. If the content of Fe in the aluminum alloy of the present embodiment is at least 0.5% by mass, the mechanical strength of the aluminum alloy of the present embodiment improves, and if no more than 7% by mass, the malleability of the aluminum alloy of the present embodiment improves.

The content of Mn in the aluminum alloy of the present embodiment is at least 0.1% by mass and no more than 7% by mass, and preferably at least 0.5% by mass and no more than 2% by mass. If the content of Mn in the aluminum alloy of the present embodiment is at least 0.1% by mass and no more than 7% by mass, the malleability of the aluminum alloy of the present embodiment improves.

The aluminum alloy of the present embodiment may further contain Be or Zr. Growth of the β-phase Al—Si—Fe metal intermetallic compound is thereby further suppressed.

The content of Be in the aluminum alloy of the present embodiment is preferably at least 0.05% by mass and no more than 1% by mass, and is more preferably at least 0.1% by mass and no more than 0.5% by mass. If the content of Be in the aluminum alloy of the present embodiment is at least 0.05% by mass and no more than 1% by mass, the malleability of the aluminum alloy of the present embodiment improves.

The content of Zr in the aluminum alloy of the present embodiment is preferably at last 0.2% by mass and no more than 5% by mass, and is more preferably at least 0.4% by mass and no more than 2.0% by mass. If the content of Zr in the aluminum alloy of the present embodiment is at least 0.2% by mass and no more than 5% by mass, the malleability of the aluminum alloy of the present embodiment improves.

The above-mentioned aluminum alloy may further contain Cu, Zn, Mg, Ti and Ni.

The form of aluminum alloy of the present embodiment is not particularly limited; however, ingot, powder, rod, sheet, etc. can be exemplified, for example.

The ingot, for example, can be manufactured by dissolving the master alloy at the melting point or higher to make a molten metal, followed by pouring the molten metal into a mold made of iron.

It should be noted that, during the manufacture of ingot, it is preferable to conduct a degassing process.

The powder can be manufactured by pulverizing the ingot, for example.

(Manufacturing Method of Laminated Molding)

A manufacturing method of a laminated molding of the present embodiment performs laminate molding using powder of the aluminum alloy of the present embodiment.

For example, a process is repeated in which, using a metal 3D printer, powder of aluminum alloy of the present embodiment is laid in a thickness of at least 1 μm, and a laser beam or electron beam is irradiated on a specific site, the powder is melted by heating to a temperature of at least the melting point, followed by solidifying the dissolved powder at a cooling rate of at least $1\times10^{4\circ}$ C./s.

(Laminated Molding)

A laminated molding of the present embodiment is a laminated molding of the aluminum alloy of the present embodiment, and is manufactured by the manufacturing method of a laminated molding of the present embodiment. For this reason, for the laminated molding of the present embodiment, malleability and mechanical strength improve.

The uses of the laminated molding of the present embodiment are not particularly limited; however, aluminum components of automobiles can be exemplified.

EXAMPLES

Although examples of the present invention will be explained hereinafter, the present invention is not to be limited to the examples.

Examples 1-1, 1-2, and Comparative Example 1

After dissolving the master alloy having a predetermined composition (refer to Table 1) at a temperature of at least the melting point to make molten metal, the molten metal was poured into a mold made of iron to prepare an aluminum alloy ingot. Herein, a degassing process was conducted upon preparing the aluminum alloy ingot.

(Crystal Structure Analysis)

The crystalline structure of the aluminum alloy was analyzed using a sample horizontal intensity X-ray diffractometer Rint TTRIII (made by Rigaku). At this time, CuKα radiation was used as the characteristic X-ray. In addition, the sample of aluminum alloy ingot was cut out into a 10 cm square of 1 to 10 mm thickness, followed by polishing the surface with 1,000 grit sandpaper and a buffer.

FIG. 1 shows the X-ray diffraction spectra of the aluminum alloys of Examples 1-1, 1-2 and Comparative Example 1.

It was found from FIG. 1 that, while the α-phase Al—Si—Fe intermetallic compound is present in the aluminum alloys of Examples 1-1 and 1-2, the α-phase Al—Si—Fe intermetallic compound is not present in the aluminum alloy of Comparative Example 1.

(Tensile Testing)

Tensile testing was performed, and the stretch of the aluminum alloys was measured based on ISO6892-1 or JISZ2241, using a precision universal testing machine AGX-V (manufactured by Shimadzu). At this time, a JIS No. 4 test piece was used as the test piece, and using a tensometer, the stretch of the test piece was measured (N=4).

Table 1 shows the stretch and the evaluation results of the aluminum alloys of Examples 1-1, 1-2 and Comparative Example 1.

TABLE 1

| | Si | Fe | Mn | Be | Al | Stretch (%) |
|---|---|---|---|---|---|---|
| Example 1-1 | 10 | 1 | 1 | — | Remainder | 4 |
| Example 1-2 | 10 | 1 | 1 | 0.2 | Remainder | 4.5 |
| Comparative Example 1 | 10 | 1 | — | — | Remainder | 2 |

It was found from Table 1 that the aluminum alloys of Examples 1-1 and 1-2 have greater stretch than the aluminum alloy of Comparative Example 1, i.e. higher malleability.

(SEM Observation)

Using an SU6600 scanning electron microscope (manufactured by HITACHI), the surfaces of the test pieces before and after tensile testing were observed.

Figure 2:
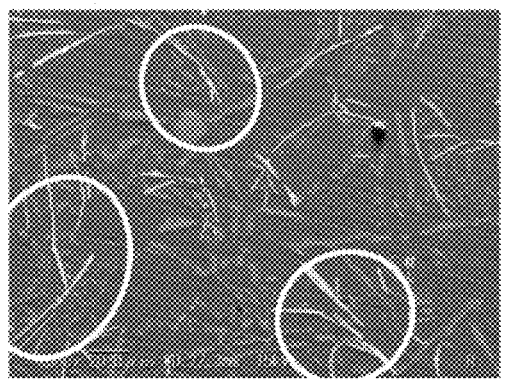
FIG. 2 provides SEM images of the surfaces of test pieces of Comparative Example 1 and Examples 1-1 and 1-2 prior to tensile testing.
Figure 2:
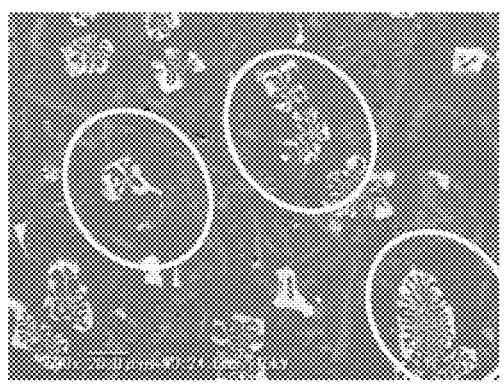
Figure 2:
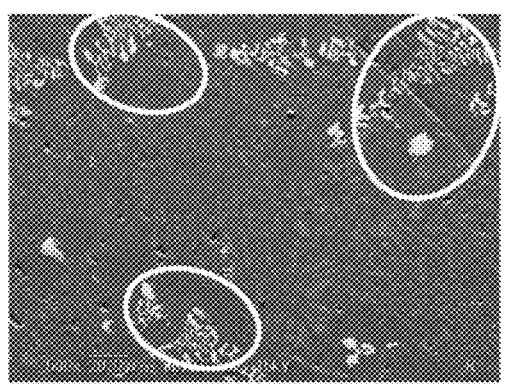
Figure 3:
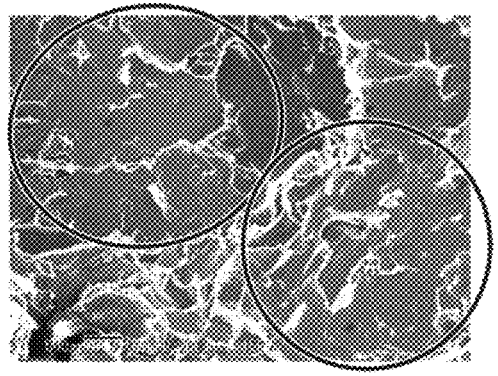
FIG. 3 provides SEM images of the surfaces of test pieces of Comparative Example 1 and Examples 1-1 and 1-2 after tensile testing.
Figure 3:
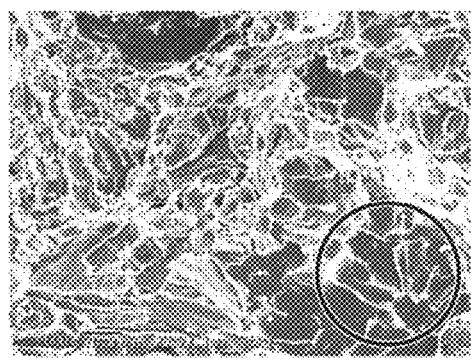
Figure 3:
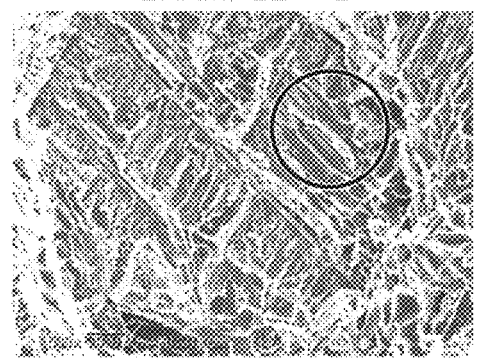

FIGS. 2 and 3 show SEM images of the surfaces of the test pieces of Comparative Example 1 and Examples 1-1 and 1-2 before and after tensile testing.

It was found from FIG. 2 that, in the test piece of Comparative Example 1 before tensile testing, the needle-like intermetallic compound (region surrounded by line), i.e. phase Al—Si—Fe intermetallic compound, grows. In contrast, in the test pieces of Examples 1-1 and 1-2 prior to tensile testing, granular intermetallic compound (region surrounded by line), i.e. α-phase Al—Si—Fe intermetallic compound, is present, and growth of β-phase Al—Si—Fe intermetallic compound is suppressed.

It was found from FIG. 3 that the test piece of Comparative Example 1 after tensile testing has a more brittle fracture appearance (region surrounded by line) than the test pieces of Examples 1-1 and 1-2 after tensile testing. For this reason, it was found that the β-phase Al—Si—Fe intermetallic compound contributes to the brittle fracture surface.

Examples 2-1 to 2-4, and Comparative Example 2

Other than changing the composition of the master alloy (refer to Table 2), aluminum alloy ingots were prepared similarly to Example 1-1.

(Crystal Structure Analysis)

As previously mentioned, when analyzing the crystalline structure of the aluminum alloy, it was found that α-phase Al—Si—Fe intermetallic compound is present in the aluminum alloys of Examples 2-1 to 2-4; whereas, in the aluminum alloy of Comparative Example 2, α-phase Al—Si—Fe intermetallic compound is not present.

(Tensile Testing)

As previously mentioned, the tensile testing of aluminum alloy was conducted.

Table 2 shows the stretch and the evaluation results of the aluminum alloys of Examples 2-1 to 2-4 and Comparative Example 2.

TABLE 2

| | Cu | Si | Fe | Zn | Mg | Ti | Ni | Mn | Be | Al | Stretch (%) |
|---|---|---|---|---|---|---|---|---|---|---|---|
| Example 2-1 | 0.26 | 6.8 | 0.5 | 0.48 | 0.4 | 0.02 | 0.025 | 0.1 | — | Remainder | 9 |
| Example 2-2 | 0.26 | 6.8 | 0.5 | 0.48 | 0.4 | 0.02 | 0.025 | 0.5 | — | Remainder | 12 |
| Example 2-3 | 0.26 | 6.8 | 0.5 | 0.48 | 0.4 | 0.02 | 0.025 | — | 0.06 | Remainder | 8 |
| Example 2-4 | 0.26 | 6.8 | 0.5 | 0.48 | 0.4 | 0.02 | 0.025 | — | 0.1 | Remainder | 8 |
| Comparative Example 2 | 0.26 | 6.8 | 0.5 | 0.48 | 0.4 | 0.02 | 0.025 | — | — | Remainder | 6 |

It was found from Table 2 that the aluminum alloys of Examples 2-1 to 2-4 have greater stretch than the aluminum alloy of Comparative Example 2, i.e. higher malleability.

Examples 3-1 to 3-4, and Comparative Example 3

Other than changing the composition of the master alloy (refer to Table 3), aluminum alloy ingots were prepared similarly to Example 1-1.
(Crystal Structure Analysis)
As previously mentioned, when analyzing the crystalline structure of the aluminum alloy, it was found that α-phase Al—Si—Fe intermetallic compound is present in the aluminum alloys of Examples 3-1 to 3-4; whereas, in the aluminum alloy of Comparative Example 3, α-phase Al—Si—Fe intermetallic compound is not present.
(Tensile Testing)
As previously mentioned, the tensile testing of aluminum alloy was conducted.
Table 3 shows the stretch and the evaluation results of the aluminum alloys of Examples 3-1 to 3-4 and Comparative Example 3.

TABLE 3

| | Cu | Si | Fe | Zn | Mg | Ti | Ni | Mn | Be | Al | Stretch (%) |
|---|---|---|---|---|---|---|---|---|---|---|---|
| Example 3-1 | 0.26 | 6.8 | 1 | 0.48 | 0.4 | 0.02 | 0.025 | 0.1 | — | Remainder | 3 |
| Example 3-2 | 0.26 | 6.8 | 1 | 0.48 | 0.4 | 0.02 | 0.025 | 0.5 | — | Remainder | 4 |
| Example 3-3 | 0.26 | 6.8 | 1 | 0.48 | 0.4 | 0.02 | 0.025 | — | 0.02 | Remainder | 4 |
| Example 3-4 | 0.26 | 6.8 | 1 | 0.48 | 0.4 | 0.02 | 0.025 | — | 0.1 | Remainder | 8 |
| Comparative Example 3 | 0.26 | 6.8 | 1 | 0.48 | 0.4 | 0.02 | 0.025 | — | — | Remainder | 2 |

It was found from Table 3 that the aluminum alloys of Examples 3-1 to 3-4 have greater stretch than the aluminum alloy of Comparative Example 3, i.e. higher malleability.

What is claimed is:
1. A laminated molding comprising an aluminum alloy, the aluminum alloy comprising:
Si, Fe, Mn and inevitable impurities,
wherein α-phase Al—Si—Fe intermetallic compound is present in the aluminum alloy, and
wherein content of Si is at least 3% by mass and no more than 20% by mass, content of Fe is at least 1% by mass and no more than 7% by mass, and content of Mn is at least 0.1% by mass and no more than 7% by mass.
2. The laminated molding according to claim 1, wherein the aluminum alloy further comprises Be or Zr.
3. The laminated molding according to claim 2,
wherein content of Be is at least 0.05% by mass and no more than 1% by mass, and
content of Zr is at least 0.2% f by mass and no more than 5% by mass.
4. The laminated molding according to claim 1, wherein the aluminum alloy further comprises Cu, Zn, Mg, Ti, and Ni.
5. A manufacturing method of the laminated molding comprising the aluminum alloy according to claim the manufacturing method comprising a step of laminate molding using powder of the aluminum alloy.

* * * * *